(12) United States Patent
Weston et al.

(10) Patent No.: US 12,548,319 B2
(45) Date of Patent: Feb. 10, 2026

(54) SATELLITE-ENABLED OFF-ROAD OBSTACLE DETECTION

(71) Applicant: FORD GLOBAL TECHNOLOGIES, LLC, Dearborn, MI (US)

(72) Inventors: Keith Weston, Canton, MI (US); Andrew Denis Lewandowski, Sterling Heights, MI (US); Jordan Barrett, Milford, MI (US); Brendan F. Diamond, Grosse Pointe, MI (US); Michael Alan McNees, Flat Rock, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 274 days.

(21) Appl. No.: 17/934,766

(22) Filed: Sep. 23, 2022

(65) Prior Publication Data
US 2024/0104925 A1  Mar. 28, 2024

(51) Int. Cl.
*G06V 20/13* (2022.01)
*G01C 21/00* (2006.01)
*G01C 21/36* (2006.01)
*G06V 10/25* (2022.01)
*G06V 10/26* (2022.01)
*G08G 1/16* (2006.01)

(52) U.S. Cl.
CPC ......... *G06V 20/13* (2022.01); *G01C 21/3694* (2013.01); *G01C 21/3826* (2020.08); *G06V 10/25* (2022.01); *G06V 10/267* (2022.01); *G08G 1/161* (2013.01)

(58) Field of Classification Search
CPC ...... G06V 20/13; G06V 10/25; G06V 10/267; G06V 10/806; G06V 10/82; G01C 21/3694; G01C 21/005; G01C 21/3826; G08G 1/161
See application file for complete search history.

(56) References Cited

U.S. PATENT DOCUMENTS

| | | |
|---|---|---|
| 8,260,539 B2 | 9/2012 | Zeng |
| 9,547,989 B2 | 1/2017 | Fairfield et al. |
| 9,948,898 B2 | 4/2018 | Barfield, Jr. et al. |
| 10,012,735 B1 * | 7/2018 | Loveland ............... G01S 17/89 |

(Continued)

OTHER PUBLICATIONS

Maurya, Lalit, et al., "A social spider optimized image fusion approach for contrast enhancement and brightness preservation," published in Applied Soft Computing in Mar. 2017 and available at https://www.sciencedirect.com/science/article/pii/S1568494616305257 (Year: 2017).*

(Continued)

*Primary Examiner* — Keith D Bloomquist
(74) *Attorney, Agent, or Firm* — Joseph Zane; Brooks Kushman P.C.

(57) ABSTRACT

Use of a satellite network as a source of image data for detection of off-road obstacles is provided. Image data from a satellite network is received to an OBU of a vehicle via a transceiver of the vehicle. The image data is related to an off-road location to be traversed by the vehicle. A navigation map indicating locations of any obstacles detected as being present based on an analysis of changes in the image data over time is displayed in an HMI of the vehicle.

22 Claims, 6 Drawing Sheets

(56) References Cited

U.S. PATENT DOCUMENTS

| | | | | |
|---|---|---|---|---|
| 10,106,153 | B1* | 10/2018 | Xiao | B62D 15/02 |
| 10,331,126 | B2 | 6/2019 | Doane et al. | |
| 10,737,698 | B2 | 8/2020 | Tatourian et al. | |
| 2005/0024492 | A1 | 2/2005 | Schaefer et al. | |
| 2005/0113987 | A1* | 5/2005 | Fink | G05D 1/0038 |
| | | | | 701/469 |
| 2010/0292914 | A1* | 11/2010 | Vepsalainen | G01C 21/3453 |
| | | | | 701/532 |
| 2015/0127212 | A1 | 5/2015 | Chacon et al. | |
| 2016/0314363 | A1* | 10/2016 | Choi | G06T 7/215 |
| 2018/0188046 | A1* | 7/2018 | Akiva | G01C 21/005 |
| 2019/0050625 | A1* | 2/2019 | Reinstein | G06V 10/235 |
| 2019/0197323 | A1* | 6/2019 | Sakai | G06V 10/764 |
| 2019/0320327 | A1* | 10/2019 | Lee | G06V 20/176 |
| 2020/0117201 | A1* | 4/2020 | Oetken | G05D 1/0231 |
| 2020/0284588 | A1* | 9/2020 | Sundar | G06V 20/586 |
| 2021/0156688 | A1* | 5/2021 | Prabhakar | H04L 67/12 |
| 2022/0048537 | A1* | 2/2022 | Lau | B60W 60/0015 |
| 2023/0146213 | A1* | 5/2023 | Maeda | G08G 1/166 |
| | | | | 340/905 |

OTHER PUBLICATIONS

Vorovencii, Iosif, "Use of the "Tasseled Cap" Transformation for the Interpretation of Satellite Images," published at ResearchGate in Jan. 2007 and available at https://www.researchgate.net/publication/259479299_Use_of_the_Tasseled_Cap_Transformation_for_the_Interpretation_of_Satellite_Images (Year: 2007).*

* cited by examiner

SATELLITE-ENABLED OFF-ROAD OBSTACLE DETECTION

TECHNICAL FIELD

Aspects of the present disclosure relate to use of satellites as a source of image data for detection of off-road obstacles.

BACKGROUND

Off-roading may refer to the driving of vehicles on unpaved ground. The ground may include sand, rivers, rocks, sand dunes, and other types of unpaved surface. Some off-road locations may include defined trails for use by off-roading enthusiasts. Other off-road locations are unstructured, allowing drivers to freely explore the environment.

Vehicle-to-everything (V2X) is a type of communication that allows vehicles to communicate with various aspects of the traffic environment. This communication may include interacting with vehicles using vehicle-to-vehicle (V2V) communication and interacting with infrastructure using vehicle-to-infrastructure (V2I) communication.

Vehicles may include radio transceivers and vehicle telematics control units (OBUs) to facilitate V2X communications. Road-side units (RSUs) may provide wireless communications from roadside infrastructure to the OBUs. Such communication may be referred to as infrastructure-to-vehicle (I2V) communication. RSUs generally operate in the same frequency band as V2X, over technologies such as Cellular Vehicle-to-Everything (CV2X) and Dedicated Short Range Communications (DSRC) technologies. Some RSUs provide additional functionality, such as local Wi-Fi hotspots for pedestrians or cellular backhaul to communicate information with a central system.

SUMMARY

In one or more illustrative examples, a system for use of a satellite network as a source of image data for detection of off-road obstacles is provided. The system includes a transceiver of a vehicle, a human machine interface (HMI) of the vehicle; and an OBU of the vehicle. The OBU is configured to receive image data from the satellite network related to an off-road location to be traversed by the vehicle, and display, in the HMI of the vehicle, a navigation map indicating locations of any obstacles detected as being present based on an analysis of changes in the image data over time.

In one or more illustrative examples, a method for use of a satellite network as a source of image data for detection of off-road obstacles is provided. Image data from a satellite network is received to an OBU of a vehicle via a transceiver of the vehicle. The image data is related to an off-road location to be traversed by the vehicle. A navigation map indicating locations of any obstacles detected as being present based on an analysis of changes in the image data over time is displayed in an HMI of the vehicle.

In one or more illustrative examples, a non-transitory computer-readable medium includes instructions for use of a satellite network as a source of image data for detection of off-road obstacles that, when executed by one or more processors, cause the one or more processors to perform operations including to send, via a transceiver of a vehicle, a route to the satellite network to request, from the satellite network, the image data related to an off-road location to be traversed by the vehicle; receive, to an OBU of the vehicle via the transceiver responsive to the route, the image data from the satellite network, the image data being related to the off-road location; and display, in an HMI of the vehicle, a navigation map indicating locations of any obstacles detected as being present based on an analysis of changes in the image data over time.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Desert and other off-road landscapes may evolve and change. These changes may occur slowly, but in other cases may occur rapidly over time. For example, witch eyes and other off-road obstacles may form unbeknown to the vehicle. These obstacles may impede travel along the off-road locations, especially if obstacle placement is not readily visible. Obstacles resulting from changed terrain may cause even experienced off-road drivers to end up in situations where recovery is desired. In hot desert climates, recovery can be particularly challenging.

An off-road navigation system may utilize V2I satellite-based communication to have a satellite scan of an area performed, before the vehicle reaches the desired off-roading location. To do so, a user may input a location of where they would like to take their vehicle off-roading. This location may be requested days or hours beforehand, or on-site, depending on how large of a location is to be analyzed as well as relating to the satellite's coverage of the surface. The vehicle may communicate with the satellite via V2I communication to instruct a satellite where to image. In some examples, pictures may be taken over time. This may include, for example images that are taken at a first time, and then again at a second time.

The satellite may send the image data to the vehicle. The vehicle may then perform analysis, either cloud-based analysis or on-board depending on computational capacity of vehicle and/or computational load. The analysis may identify features of the terrain, which may be compared against historical data to identify differences. Using this satellite vision system, the vehicle may identify new off-road obstacles (e.g., witch eyes in sand dunes). If the system is unable to determine whether features have changed, such as based on lack of receipt of images (or lack of images of adequate quality), an area may be marked as unknown or to stay away from. If the area is one that has had feature or terrain changes based on historical references, that area may be watched more closely or more often than other areas.

The locations that have features changes (and potentially the satellite imagery of those locations) may be communicated via V2I communication to other vehicles passing through the area, or to other vehicles that may soon pass through the off-road areas through. Any identified obstacle may be communicated to the driver and/or route guidance system of the vehicle. This information may, in an example, be overlayed on the map in the navigation display. If the user does not have the navigation active, the system may notify the to switch to the navigation display to see the details.

The vehicle navigation system may compare the current vehicle trajectory or route with the identified changed features of the terrain landscape. If the change feature represents a potential issue to the vehicle (either by incline, orientation, size metrics like depth, shape, location relative other features, etc.), the vehicle may inform the user to change the trajectory of the vehicle and/or change the route to keep distance from these obstacles.

Figure 1:
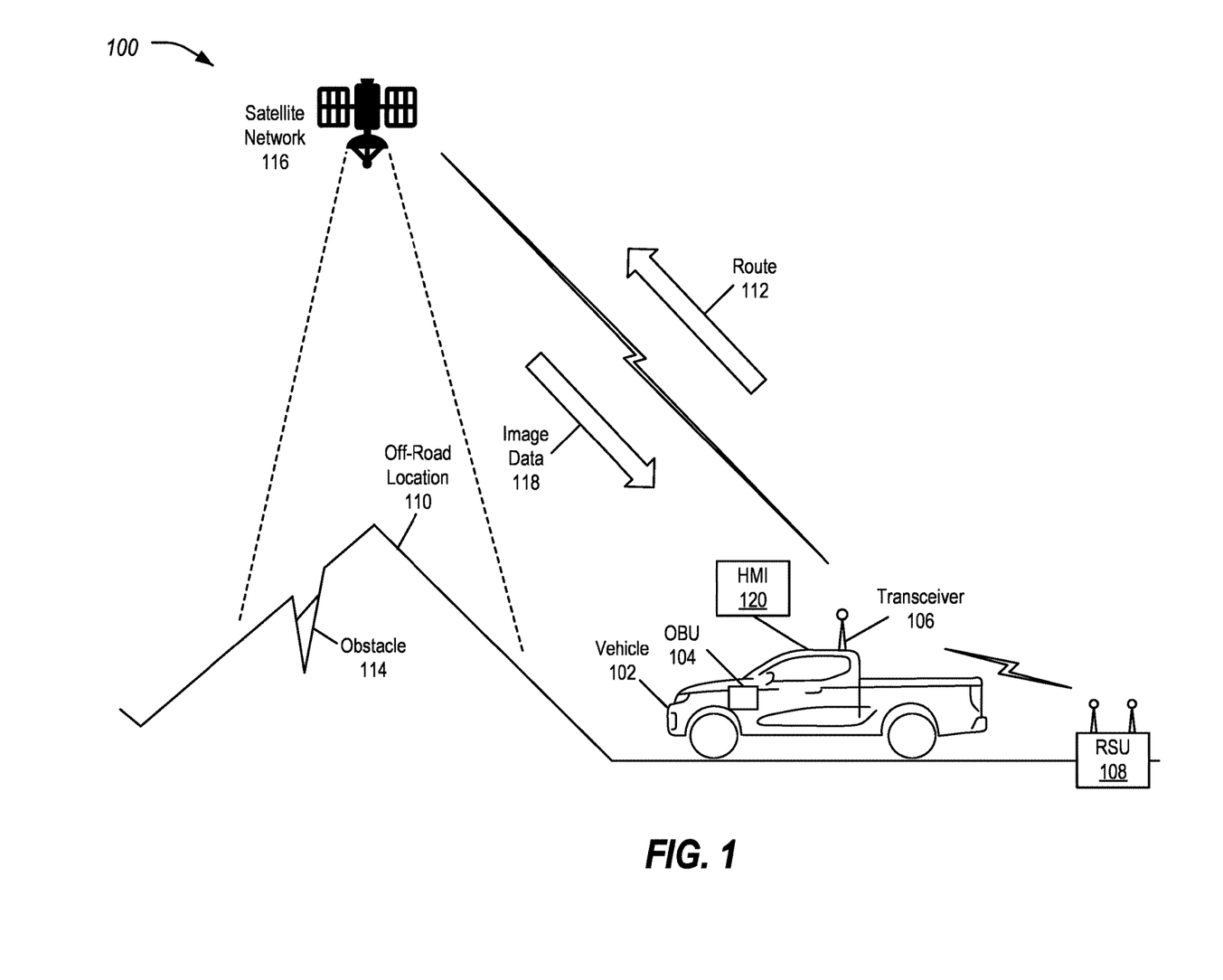
FIG. 1 illustrates an example system for use of a satellite network as a source of image data for detection of off-road obstacles.

FIG. 1 illustrates an example system 100 for use of satellites as a source of image data for detection of off-road obstacles. As shown, the system 100 includes a satellite-enabled vehicle 102 configured to travel along an off-road location 110. The vehicle 102 includes an OBU 104 and a transceiver 106. The transceiver 106 may allow the OBU 104 to communicate with a satellite network 116. The vehicle 102 may also include an HMI 120 to allow the user to interact with the vehicle 102. It should be noted that the system 100 shown in FIG. 1 is merely an example, and systems having more, fewer, and different arrangements of elements may be used.

The vehicle 102 may include various other types of passenger vehicles, such as sedans, crossover utility vehicles (CUVs), vans, sport utility vehicles (SUVs), trucks, recreational vehicles (RVs), scooters, or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric vehicle (HEV) powered by both an internal combustion engine and one or more electric motors, such as a series hybrid electric vehicle, a parallel hybrid electric vehicle, or a parallel/series hybrid electric vehicle. As yet a further possibility, the vehicle 102 may be an electric vehicle (EV) powered by electric motors without an internal combustion engine. As the type and configuration of vehicles 102 may vary, the capabilities of the vehicles 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (YIN).

The OBU 104 may be configured to provide telematics services to the vehicle 102. These services may include, as some non-limiting possibilities, navigation, turn-by-turn directions, vehicle health reports, local business search, accident reporting, and hands-free calling. The OBU 104 may be in communication with a transceiver 106. The OBU 104 may accordingly be configured to utilize the transceiver 106 to communicate over a cellular network over various protocols. For instance, the OBU 104 may access the cellular network via connection to one or more cellular towers (not shown). To facilitate the communications over the communications network, the OBU 104 may be associated with unique device identifiers (e.g., mobile device numbers (MDNs), Internet protocol (IP) addresses, etc.) to identify the communications of the OBU 104 on the communications network as being associated with the vehicle 102. The OBU 104 may, additionally, be configured to communicate over a broadcast peer-to-peer protocol (such as PC5), to facilitate V2X communications with devices such as a RSU 108. It should be noted that these protocols are merely examples, and different peer-to-peer and/or cellular technologies may be used.

The vehicle 102 may be configured to travel along a route 112 to a destination. In an example the route 112 may be specified as a destination location. In another example, the route 112 may further include additional information, such as waypoints along the route 112. In yet another example, the route 112 may indicate more complete directions to the destination, such as turn-by-turn directions and/or road segments to be traversed.

In many navigational systems, the vehicle 102 may be intended to traverse predefined roadways. These roadways are typically controlled by traffic signals, lane markers, and the like. However, in other instances, the vehicle 102 may be designed to traverse off-road locations 110. As opposed to on-road navigation, off-road locations 110 may lack traffic controls, defined locations for travel, and/or the maintained quality of surface that is usually performed for on-road travel. Moreover, off-road locations 110 may also lack maximum grade and visibility assurances considered when engineering roadways. Thus, it may be possible that an off-road location 110 may develop an obstacle 114 that may be difficult for a driver to be able to detect.

The vehicle 102 may also include an HMI 120. The HMI 120 may include various displays, such as a screen in a center stack of the vehicle 102 cabin. The HMI 120 may also include one or more speakers for providing audio output to a user. The HMI 120 may also include facilities for receiving input, such as one or more buttons, controls, touch screens, microphones, etc. In a specific example, the HMI 120 may be used to allow a user to enter a route 112 into the vehicle 102.

The OBU 104 may include global navigation satellite system (GNSS) functionality to allow the vehicle 102 to implement autonomous geo-spatial positioning for the vehicle 102. As some examples, the GNSS functionality may allow the vehicle 102 to determine its position using one or more satellite networks 116, such as global positioning system (GPS), GLONASS, Galileo, Beidou and/or others.

The vehicle 102 may also be configured to utilize the transceiver 106 to perform other data communications with the satellite network 116. In an example, the vehicle 102 may be configured to send the route 112 information to the satellite network 116 and receive image data 118 back from the satellite network 116.

The satellite network 116 may include satellites having one or more imaging devices configured to capture the image data 118, such as visible light sensors, infrared sensors, light detection and ranging (LIDAR) sensors, radio detection and ranging (RADAR) sensors, etc. These image data 118 may, for example, be taken of the areas specified by the route 112. The image data 118 may be taken with various spatial resolutions, frame rates, dynamic ranges, and/or color channels (RGB, monochrome, infrared, etc.). Further the satellite network 116 may capture information regarding depth, e.g., based on direct and indirect time of flight.

Integrating a historical image map classification of satellite image data 118 may allow the system 100 to enhance detection of everchanging land or terrain features of the off-road locations 110. For instance, the image data 118 from the satellite network 116 may be captured over a defined period of time for the off-road location 110. This image data 118 may be used to identify a change in the area of off-road location 110. For example, this change may be indicative of the creation of one or more obstacles 114 that were not previously present at the off-road location 110. In one non-limiting example, the satellite network 116 may be configured to periodically monitor areas, where such data is indexed by location and time for access by the vehicles 102. Aspects of the processing of the image data 118 to identify the obstacles 114 is discussed in detail with respect to FIGS. 2-3.

Figure 2:
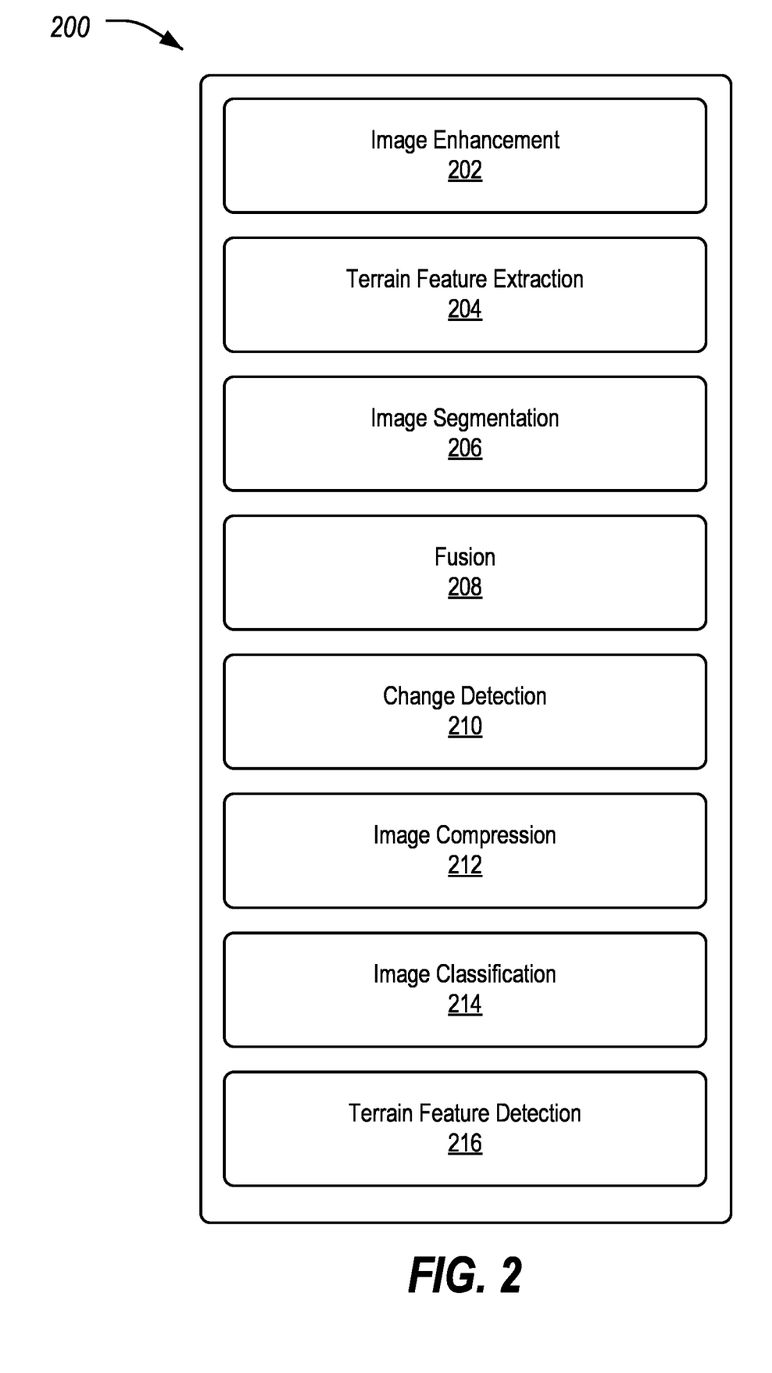
FIG. 2 illustrates details of a framework for the processing of image data received from the satellite network for the off-road location.

FIG. 2 illustrates a functional block view of a framework 200 for the processing of image data 118 received from the satellite network 116 for the off-road location 110. The image data 118 from the satellite network 116 is received as input to the processing. In an example, the processing may be performed by the OBU 104 or another controller of the vehicle 102. In another example, the processing may be performed in whole or in part by one or more computing devices separate from the vehicle 102. In one alternative, the satellite network 116 may be in communication with a cloud system configured to perform the image processing for the image data 118 requested by the vehicles 102. The processing of the historical satellite image data 118 may be complex due to the large dimensionality of the image data 118. Thus, it may be desirable for the processing to be performed as part of the pre-trip planning. As discussed in detail herein, the framework 200 for the processing may include image enhancement 202, terrain feature extraction 204, image segmentation 206, image fusion 208, change detection 210, image compression 212, image classification 214, and terrain feature detection 216.

With respect to image enhancement 202, since satellite image data 118 is inherently comprised of low brightness levels, this aspect of the framework 200 is performed such that relevant details are preserved without loss of image information. In an example, approaches such as Cuckoo Search optimization algorithm coupled with a differential evolution algorithm may be utilized to support maintaining the average intensities in the satellite images while also enhancing the details of the image data 118.

With respect to the terrain feature extraction 204, using saliency analysis a feature list may be generated from the enhanced images from the image enhancement 202. This may be accomplished such that the features are extracted without unwanted features remaining in the extracted image. After comprising the saliency feature map, a fusion method may be used to combine the features, thus suppressing background information and enhancing regions of interest (ROIs) to increase image quality. Angular difference features (ADFs) may be used to understand the scene and to provide differentiation of structures, such as witch eyes, from normal landscape features.

With respect to the image segmentation 206, the image data 118 may be divided into different segments so objects and boundaries can be located. In an example, the segmentation may be performed using a Cuckoo Search Algorithm referred to as McCulloch's method. This approach may produce images with a much higher resulting peak signal-to-noise ratio (PSNR). This will help aid in the segmentation of satellite image data 118 and their many ambiguous areas due to shadowing effects realized in terrain landscape photos. Other methods such as distributed convolutional neural networks (DCNNs) may be used if consistently high-resolution image data 118 were being processed.

With respect to the image fusion 208, the image fusion 208 may accordingly fuse together the images from the feature extraction process and may combine two or more images to form a new combined image. In an example, the image fusion 208 may be performed for the same off-road location 110 over time, to allow for differences over time to be tracked and analyzed by the change detection 210.

The change detection 210 may be performed to understand the changes in a particular area under the assumption that satellite image data 118 over the area of interest or area being scanned for the off-road location 110 is available. For this aspect in the framework 200, tasseled cap transformation (TCT) along with image differencing may be used to detect changes in the landscape. From the TCT images, mean and variance parameters may be assessed to determine the probability that spatial and temporal changes in the image data 118 have occurred.

With respect to the image compression 212, the image data 118 obtained from the satellite network 116 may be very large in terms of data storage. Thus, the image data 118 may be compressed to reduce storage and bandwidth for transmission and analysis purposes.

With respect to the image classification 214, patterns may be classified based on various similarity measures. The image classification 214 may employ Bayesian modelling to determine the presence of clouds and if such is the determination further processing will be aborted; otherwise, discrete wavelet transform (DWT) image transformation/decomposition into frequency bands and/or genetic algorithms may be used to provide feature classification information.

Regarding terrain feature detection 216, this aspect may allow for differentiation of normal features from those of interest such as Witch's eyes. These features may be identified as being the obstacles 114. Here, the processing may identify a set of salient points in each image. Another factor which may affect image quality is the presence of jitter in the image. Techniques such as Bidirectional Kalman filters and smoothing filters may be used to reduce the effects of jitter. A reimaging model may also be used to get obtain a jitter-corrected image. The results from this processing may be used to inform the driver of upcoming obstacles 114 that may lie ahead on the present direction of travel at the off-road location 110.

Figure 3:
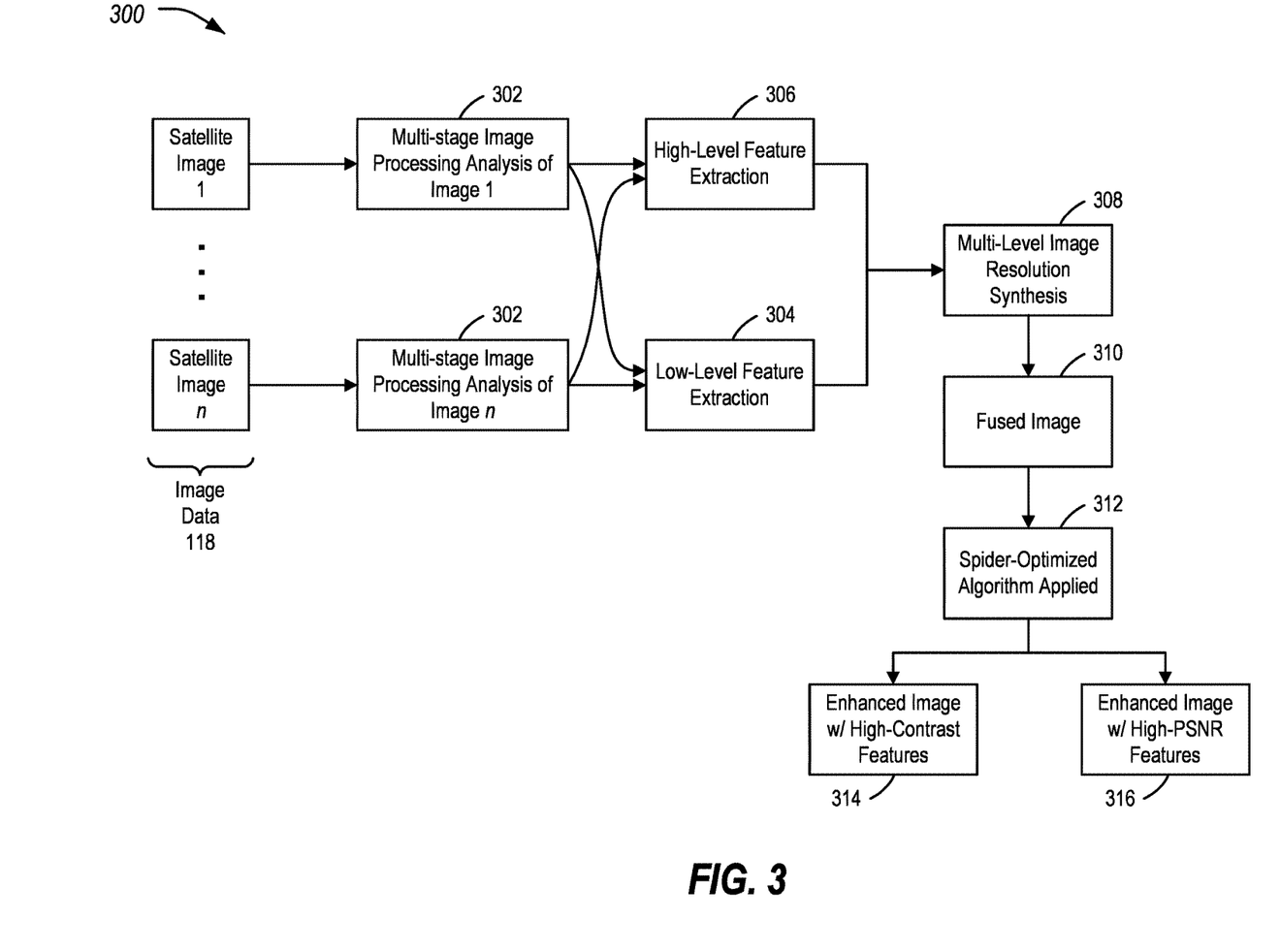
FIG. 3 illustrates data flow details of the processing of the image data.

FIG. 3 illustrates data flow 300 details of the processing of the image data 118 using the capabilities of the framework 200. As shown, the data flow 300 begins with receipt of the satellite images 1 through n.

Multi-stage image processing analysis 302 may be performed to the received images. The multi-stage image processing analysis 302 may include, for example, the image enhancement 202, the image segmentation 206, the change detection 210, and the image compression 212 as discussed above.

Next, the feature extraction 204 as discussed with respect to FIG. 2 may be performed. This feature extraction 204 may include low-level feature extraction 304 as well as high-level feature extraction 306. The low-level feature extraction 304 may be configured to identify minor details of the image data 118, such as lines or dots. These features may be using technotes such as a convolutional filter, or scale-invariant feature transform (SIFT) or histogram of oriented gradient (HOG) for more abstract features such as edges. The high-level feature extraction 306 may include features that are built on top of the low-level features, such as detections of objects and larger shapes in the image data 118. It should be noted that in some examples, aspects of the low-level feature extractions 304 and the high-level feature extractions 306 may be combined, such as via a convolutional neural network (CNN) where the initial convolutional layers learn filters for finding lines, dots, curves etc. while the later layers will learn to recognize higher level objects and shapes.

Next, multi-level image resolution synthesis 308 may be performed using the identified features. Multi-level image resolution synthesis 308 may be part of image fusion algorithms, as discussed with respect to image fusion 208 in the framework 200. In these operations, images may be synthesized or reconstructed to highlight features (high and low) extracted in the previous step. Image synthesis may take and combine the features from the previous high and low level feature extraction components to attain a more accurate and informative image, thus creating a fused image 310. The fused image 310 is a result of synthesis of feature extraction images.

Next a spider-optimized algorithm 312 is applied to the fused image 310. The spider-based optimization, sometimes referred to as a social spider optimization algorithm, may process the previously fused image 310 and create a new image with enhancements to the contrast and also one that preserves the brightness of the image. Another result of this algorithm may be a relatively high PSNR or Peak-Signal-Noise-Ratio. High PSNR is desirable when dealing with image compression and noise, as such a technique may produce a high definition image with a relatively small data size. The spider-optimized algorithm 312 may provide enhanced images with high contrast features 314 and/or enhanced images with high-PSNR features 316. Additionally the image classification 214 of the framework 200 may be used to indicate obstacles, features, etc. in the high contrast feature 314 and terrain feature detection 216 images.

Figure 4:
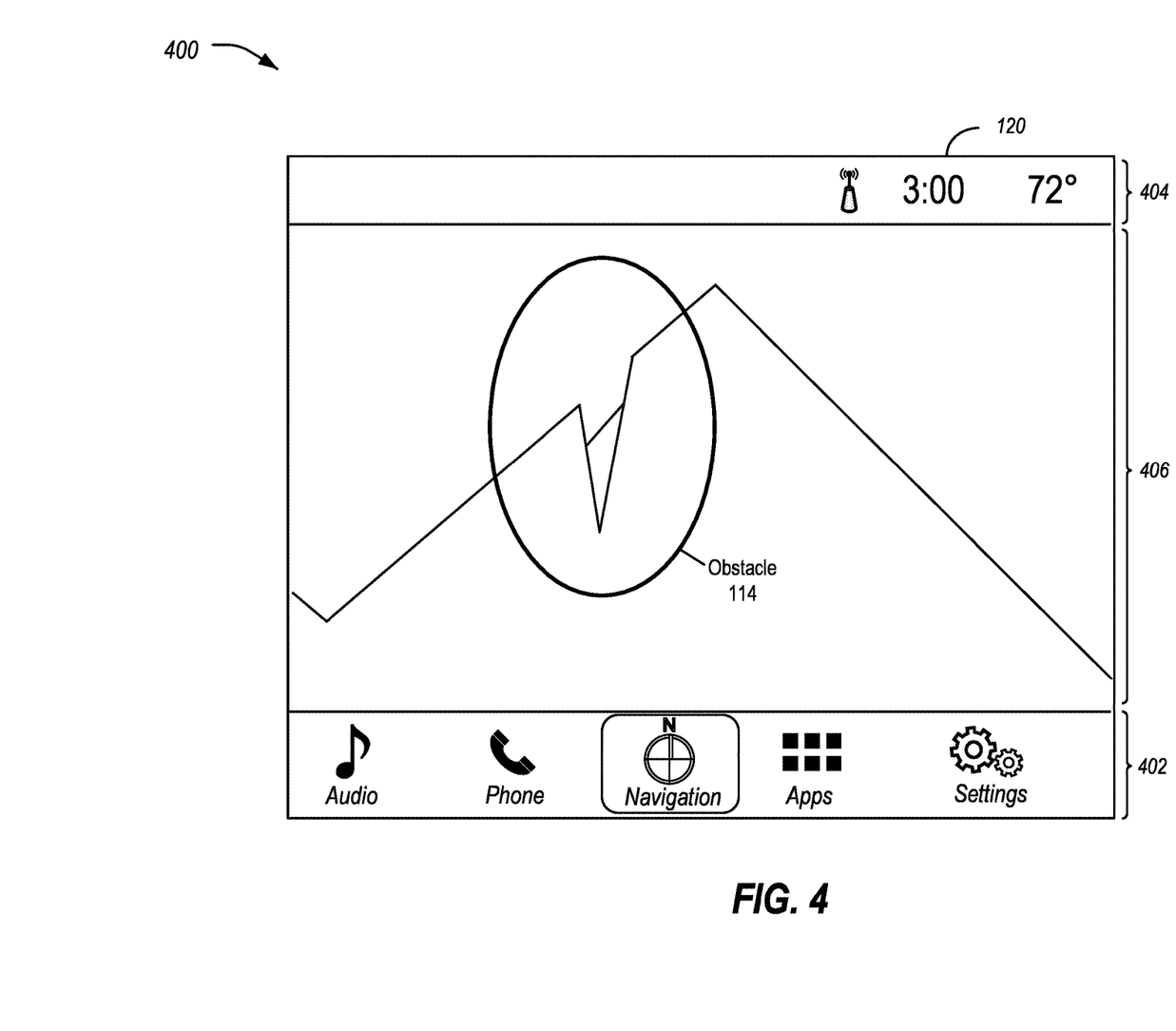
FIG. 4 illustrates an example of the vehicle displaying a user interface illustrating a navigation view of an obstacle identified via the satellite network.

FIG. 4 illustrates an example of the vehicle 102 displaying a user interface 400 illustrating a navigation view of an obstacle 114 identified via the satellite network 116. In an example, the user interface 400 may be displayed on a head unit or other HMI 120 of the vehicle 102.

As shown, the user interface 400 includes a category listing 402 of one or more screens of content to be displayed in a main screen area 406 of the HMI 120. As some examples, the category listing 402 may include an audio screen from which configuration of vehicle 102 audio settings may be performed, a phone screen from which calling services may be utilized, a navigation screen from which maps and routing may be performed, a favorites screen from which settings marked as favorites may be easily accessed, an applications screen from which installed applications may be invoked, a settings screen from which backlighting or other general settings of the HMI 120 may be accessed, and a features screen illustrating features of the vehicle 102. The user interface 400 may also include a general information area 404 from which time, current temperature, and other information may remain visible to the user, regardless of the specific screen or application that is active in the main screen area 406.

The main screen area 406 may show content from the selected category of content. In the illustrated example, the navigation screen may be displayed, for example, responsive to user selection of the navigation from the category listing 402. In another example, the navigation screen may be automatically presented to the user responsive to the vehicle 102 determining that an obstacle 114 was located that the user should be alerted of By alerting the user of the obstacle 114, the user may be able to ensure that the vehicle 102 remains away from the obstacle 114.

Figure 5:
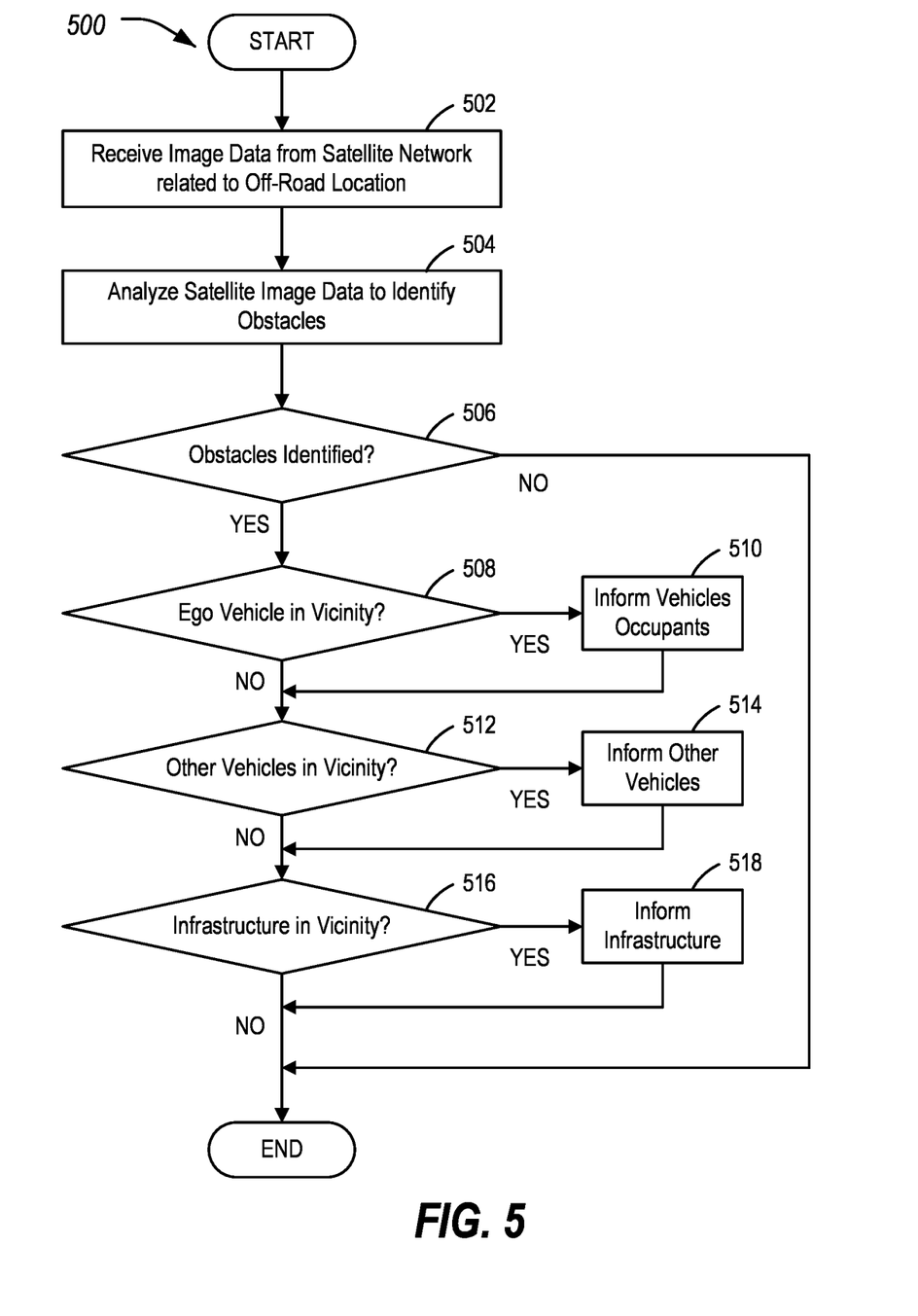
FIG. 5 illustrates an example process for use of the satellite network as the source of the image data for the detection of the off-road obstacles.

FIG. 5 illustrates an example process 500 for use of the satellite network 116 as a source of the image data 118 for the detection of the off-road obstacles 114. In an example, the process 500 may be performed by the vehicle 102 in the context of the system 100.

At operation 502, the vehicle 102 receives image data 118 from the satellite network 116 related to an off-road location 110. In an example, the vehicle 102 may send an intended route 112 of the vehicle 102 to the satellite network 116. The route 112 may involve the vehicle 102 traversing an off-road location 110. The satellite network 116 may return, in response, image data 118 corresponding to the geographic region including the off-road location 110.

At operation 504, the vehicle 102 analyses the image data 118 to identify obstacles 114. This analysis may be performed as discussed above with respect to FIGS. 2 and 3. For instance, the image data 118 from the satellite network 116 may be captured over a defined period of time for the off-road location 110. This image data 118 may be used to identify a change in the area of off-road location 110. For example, this change may be indicative of the creation of one or more obstacles 114 that were not previously present at the off-road location 110. In an example, the processing may be performed by the OBU 104 or another controller of the vehicle 102. In another example, the processing may be performed in whole or in part by one or more computing devices separate from the vehicle 102. In one alternative, the satellite network 116 may be in communication with a cloud system configured to perform the image processing for the image data 118 requested by the vehicles 102. It should be noted that operations 502 and 504 may be performed, in some examples, prior to the vehicle 102 traveling along the route 112.

At operation 506, the vehicle 102 determines whether any obstacles 114 were identified at operation 504. If so, control passes to operation 508. If not, the process 500 ends.

At operation 508, the vehicle 102 determines whether the vehicle 102 itself is in vicinity of the obstacles 114. In an example the vehicle 102 may utilize GNSS or other location functionality of the satellite network 116 to identify the precise location of the vehicle 102. If the vehicle 102 moves to within a predefined threshold distance from an obstacle 114, then control passes to operation 510. If not, control proceeds to operation 512.

At operation 510, the vehicle 102 indicates to the user, in the HMI 120, that the obstacle 114 is in the vicinity of the vehicle 102. An example HMI 120 illustrating an obstacle 114 in a navigation view is illustrated above with respect to FIG. 4. Based on the information displayed in the HMI 120, the vehicle 102 may allow the user to adjust the route 112 to keep distance from the obstacle 114, even before the obstacle 114 is visible to the user of the vehicle 102.

At operation 512, the vehicle 102 determines whether other vehicles apart from the vehicle 102 are in vicinity of the obstacles 114. In one example, the vehicle 102 may determine, using the transceiver 106 whether messages from other vehicle are being received. If so, then the vehicle 102 may send responses back to the other vehicles indicating the location of the obstacle 114 at operation 514.

At operation 516, the vehicle 102 determines whether infrastructure is in vicinity of the obstacles 114. In one example, the vehicle 102 may determine, using the transceiver 106 whether messages from a RSU 108 are being received. If so, then at operation 518 the vehicle 102 may send responses back to the RSU 108 indicating the location of the obstacle 114. This may allow the RSU 108 to inform other vehicles of the existence of the obstacle 114, even after the vehicle 102 itself has passed through the off-road location 110.

After operation 518, the process 500 ends. It should be noted that while the operations of the process 500 are shown as being linear, in many examples the operations may be performed in different ordering and/or concurrent with one another. Additionally, the operations of the process 500 may be performed continuously and/or in a loop wise manner, such as while the vehicle 102 traversing the route 112.

Thus, a vehicle 102 navigation system for off-road locations 110 may utilize V2I satellite-based communication to have satellite scans of an area performed over time, before the vehicle 102 reaches the desired off-roading location. Any identified obstacle 114 may be communicated to the driver and/or to route 112 guidance of the navigation system of the vehicle 102. This information may, in an example, be overlayed on the map in the navigation display. Thus, if an obstacle 114 is identified via changes in the image data 118, the vehicle 102 may inform the user to change the trajectory of the vehicle 102 and/or change the route 112 to keep distance from the obstacle 114.

Figure 6:
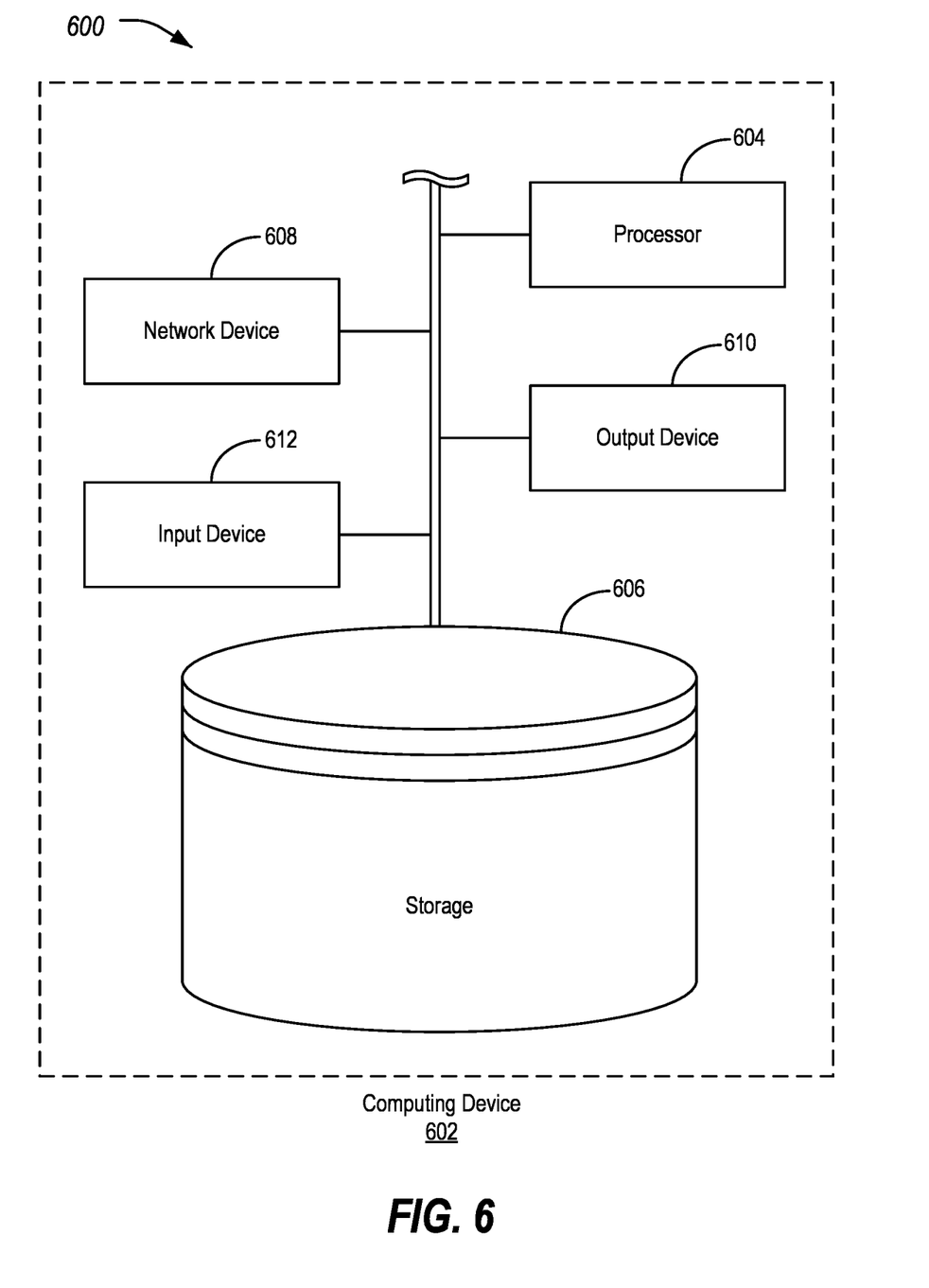
FIG. 6 illustrates an example of a computing device for use in the detection of off-road obstacles.

FIG. 6 illustrates an example 600 of a computing device 602 for use in the performance of V2X tolling transactions. Referring to FIG. 6, and with reference to FIGS. 1-5, the OBU 104, RSU 108, satellite network 116, and HMI 120 may include examples of such computing devices 602. As shown, the computing device 602 may include a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU). In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 604 executes stored program instructions that are retrieved from the storage 606. The stored program instructions, accordingly, include software that controls the operation of the processors 604 to perform the operations described herein. The storage 606 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices that receive human interface inputs may include keyboards, mice, trackballs, touchscreens, voice input devices, graphics tablets, and the like.

The network devices 608 may each include any of various devices that enable the OBU 104, RSU 108, and/or satellite network 116 to send and/or receive data from external devices over networks (such as the communications network). Examples of suitable network devices 608 include an Ethernet interface, a Wi-Fi transceiver, a cellular transceiver, a satellite transceiver, a V2X transceiver, a BLUETOOTH or BLUETOOTH Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for use of a satellite network as a source of image data for detection of off-road obstacles, comprising:
a transceiver of a vehicle;
a human machine interface (HMI) of the vehicle; and
an on-board unit (OBU) of the vehicle, configured to:
receive image data from the satellite network related to an off-road location to be traversed by the vehicle, wherein the image data comprises satellite images of the off-road location taken at a first time and then again at a second time;
perform image segmentation to identify features of the image data taken at the first time and at the second time;
perform image fusion to identify regions of interest in the image data having differences in the features over time resulting from changed terrain; and
analyze the regions of interest to identify new off-road terrain obstacles resulting from the changed terrain; and
display, in the HMI of the vehicle, a navigation map indicating locations of any of the identified new off-road terrain obstacles detected as being present at the second time but not at the first time, based on the analysis of changes over time in the image data.

2. The system of claim 1, wherein the OBU is further configured to:
send a route to the satellite network to request the image data related to the off-road location from the satellite network; and
receive the image data from the satellite network responsive to the request.

3. The system of claim 1, wherein the OBU is further configured to one or more of:
perform jitter correction of the image data to stabilize the image data; or
perform image enhancement of the image data to details of the image data.

4. The system of claim 1, wherein the OBU is further configured to:
monitor a current location of the vehicle over time; and
transition the HMI to displaying the navigation map responsive to the current location of the vehicle being within a predefined distance from the off-road obstacles.

5. The system of claim 1, wherein the OBU is further configured to, responsive to detecting, using the transceiver, messages from other vehicles, send responses to the other vehicles indicating the locations of the obstacles.

6. The system of claim 1, wherein the OBU is further configured to, responsive to detecting, using the transceiver, messages from a road-side unit (RSU), send to the RSU, the locations of the obstacles to allow the RSU to broadcast the locations of the obstacles to other vehicles.

7. The system of claim 1, wherein the OBU is further configured to perform a spider-optimized algorithm to the image data to enhance contrast and preserve the brightness.

8. The system of claim 1, wherein the OBU is further configured to perform a tasseled cap transformation (TCT) along with image differencing to detect changes in landscape between the satellite images of the off-road location taken at the first time and at the second time.

9. The system of claim 1, wherein the changed terrain includes changes in sand, and the new off-road obstacles include new obstacles in the sand.

10. The system of claim 1, wherein the new obstacles in the sand include a hidden depression in a sand dune.

11. The system of claim 1, wherein the satellite network is configured to periodically monitor a plurality of locations including the off-road location, and wherein the satellite network periodically monitors locations of the plurality of locations determined by the vehicle as having changed terrain more often than locations of the plurality of locations that have not been determined by the vehicle to have changed terrain.

12. A method for use of a satellite network as a source of image data for detection of off-road obstacles, comprising:
receiving, to an OBU of a vehicle via a transceiver of the vehicle, image data from a satellite network, the image data being related to an off-road location to be traversed by the vehicle, wherein the image data comprises satellite images of the off-road location taken at a first time and then again at a second time;
performing image segmentation to identify features of the image data taken at the first time and at the second time;
performing image fusion to identify regions of interest in the image data having differences in the features over time resulting from changed terrain;
analyzing the regions of interest to identify new off-road terrain obstacles resulting from the changed terrain; and
displaying, in an HMI of the vehicle, a navigation map indicating locations of any of the identified new off-road terrain obstacles detected as being present at the second time but not at the first time, based on an analysis of changes in the image data over time.

13. The method of claim 12, further comprising:
sending a route to the satellite network to request the image data related to the off-road location from the satellite network; and
receiving the image data from the satellite network responsive to the request.

14. The method of claim 12, further comprising one or more of:
performing jitter correction of the image data to stabilize the image data; or
performing image enhancement of the image data to details of the image data.

15. The method of claim 12, further comprising:
monitoring a current location of the vehicle over time; and
transitioning the HMI to displaying the navigation map responsive to the current location of the vehicle being within a predefined distance from the off-road obstacles.

16. The method of claim 12, further comprising, responsive to detecting, using the transceiver, messages from other vehicles, sending responses to the other vehicles indicating the locations of the obstacles.

17. The method of claim 12, further comprising, responsive to detecting, using the transceiver, messages from a RSU, sending to the RSU, the locations of the obstacles to allow the RSU to broadcast the locations of the obstacles to other vehicles.

18. A non-transitory computer-readable medium comprising instructions for use of a satellite network as a source of image data for detection of off-road obstacles that, when executed by one or more processors, cause the one or more processors to perform operations including to:

send, via a transceiver of a vehicle, a route to the satellite network to request, from the satellite network, the image data related to an off-road location to be traversed by the vehicle;
receive, to an OBU of the vehicle via the transceiver responsive to the route, the image data from the satellite network, the image data being related to the off-road location;
perform an analysis of changes in the image data over time resulting from changed terrain, the analysis including to:
  perform image segmentation to identify features of the image data taken at a first time and at a second time,
  perform image fusion to identify regions of interest in the image data having differences in the features over time,
  analyze the regions of interest to identify new off-road terrain obstacles resulting from the changed terrain; and
display, in an HMI of the vehicle, a navigation map indicating locations of any of the identified new off-road terrain obstacles detected as being present at the second time but not at the first time, based on the analysis of changes over time in the image data.

19. The medium of claim 18, further comprising instructions that, when executed by the one or more processors, cause the one or more processors to perform operations including one or more of to:

perform jitter correction of the image data to stabilize the image data; or
perform image enhancement of the image data to details of the image data.

20. The medium of claim 18, further comprising instructions that, when executed by the one or more processors, cause the one or more processors to perform operations including to:
  monitor a current location of the vehicle over time; and
  transition the HMI to displaying the navigation map responsive to the current location of the vehicle being within a predefined distance from the off-road obstacles.

21. The medium of claim 18, further comprising instructions that, when executed by the one or more processors, cause the one or more processors to perform operations including, responsive to detecting, using the transceiver, messages from other vehicles, to send responses to the other vehicles indicating the locations of the obstacles.

22. The medium of claim 18, further comprising instructions that, when executed by the one or more processors, cause the one or more processors to perform operations including, responsive to detecting, using the transceiver, messages from a RSU, to send to the RSU, the locations of the obstacles to allow the RSU to broadcast the locations of the obstacles to other vehicles.

* * * * *